(12) United States Patent
Eberl et al.

(10) Patent No.: US 11,760,199 B2
(45) Date of Patent: Sep. 19, 2023

(54) TRACTION CONTROL SYSTEM

(71) Applicant: Bayerische Motoren Werke Aktiengesellschaft, Munich (DE)

(72) Inventors: Thomas Eberl, Sauerlach (DE); Dirk Odenthal, Munich (DE); Elias Reichensdoerfer, Munich (DE); Alexander Zech, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 443 days.

(21) Appl. No.: 17/052,029

(22) PCT Filed: May 14, 2019

(86) PCT No.: PCT/EP2019/062367
§ 371 (c)(1),
(2) Date: Oct. 30, 2020

(87) PCT Pub. No.: WO2019/219698
PCT Pub. Date: Nov. 21, 2019

(65) Prior Publication Data
US 2021/0114457 A1 Apr. 22, 2021

(30) Foreign Application Priority Data

May 17, 2018 (EP) .................................... 18173045
Jul. 26, 2018 (DE) ..................... 10 2018 212 505.8

(51) Int. Cl.
*B60K 28/00* (2006.01)
*B60K 28/16* (2006.01)

(52) U.S. Cl.
CPC ................... *B60K 28/16* (2013.01)

(58) Field of Classification Search
CPC ......... B60K 28/16; B60T 8/172; B60L 15/00;
G06F 19/34
See application file for complete search history.

(56) References Cited

U.S. PATENT DOCUMENTS 5,472,061 A * 12/1995 Shiraishi ................ B60K 28/16
701/84
2009/0210128 A1 8/2009 Fujimoto et al.
(Continued)

FOREIGN PATENT DOCUMENTS

DE 41 29 984 A1 3/1993
DE 101 04 600 A1 8/2002
(Continued)

OTHER PUBLICATIONS

International Search Report (PCT/ISA/210) issued in PCT Application No. PCT/EP2019/062367 dated Jul. 22, 2019 (three (3) pages).
(Continued)

*Primary Examiner* — Truc M Do
(74) *Attorney, Agent, or Firm* — Crowell & Moring LLP

(57) ABSTRACT

A system and method for speed/traction/slip control influences a driving engine torque of the vehicle. The method includes: calculating an idealized nominal engine torque from a linear control law applied to the speed/slip error; calculating an idealized setpoint for the speed/slip by applying a reference model to the idealized nominal engine torque; calculating a linearizing feedback with properties of compensating the nonlinearities in the road surface contact, compensating the inertia in the powertrain, and damping the powertrain; using for feedback the engine rotational speed, numerically determined derivation of engine speed, average speed of the driven axis, numerically determined derivative of the rotational speed of the driven axis, actual engine torque, and applying the driving engine torque to the engine vehicle to influence the traction and stability of the vehicle.

4 Claims, 3 Drawing Sheets

(56) References Cited

U.S. PATENT DOCUMENTS

| | | | |
|---|---|---|---|
| 2015/0197234 A1 | 7/2015 | Liang et al. | |
| 2015/0274159 A1 | 10/2015 | Lu et al. | |
| 2017/0197629 A1 | 7/2017 | Redbrandt et al. | |
| 2017/0217410 A1 | 8/2017 | Kerber et al. | |
| 2018/0072306 A1 | 3/2018 | Yamazaki et al. | |
| 2018/0202380 A1* | 7/2018 | Wang | F02D 41/1402 |
| 2018/0257652 A1 | 9/2018 | Mueller et al. | |

FOREIGN PATENT DOCUMENTS

| | | |
|---|---|---|
| DE | 10 2011 085 103 A1 | 4/2013 |
| DE | 10 2013 208 329 A1 | 11/2014 |
| DE | 10 2014 213 663 A1 | 1/2015 |
| DE | 10 2013 226 894 A1 | 6/2015 |
| DE | 10 2014 208 796 A1 | 11/2015 |
| DE | 10 2015 222 059 A1 | 5/2017 |
| DE | 10 2017 216 203 A1 | 3/2019 |
| FR | 2 990 656 A1 | 11/2013 |
| WO | WO 2011/003544 A2 | 1/2011 |

OTHER PUBLICATIONS

Written Opinion (PCT/ISA/237) issued in PCT Application No. PCT/EP2019/062367 dated Jul. 22, 2019 (five (5) pages).

German-language Search Report issued in German Application No. 10 2018 212 505.8 dated Feb. 28, 2019 with partial English translation (14 pages).

Adamy J. et al., "Nichtlineare Systeme und Regelungen", 2014, pp. 1-614, Springer Vieweg, ISBN 978-3-642-45012-9 (627 pages).

German-language Austrian Office Action issued in Austrian Application No. A 9122/2019 dated Dec. 3, 2021 (four (4) pages).

Chinese-language Office Action issued in Chinese Application No. 201980029904.8 dated Mar. 24, 2023 with English translation (17 pages).

* cited by examiner

TRACTION CONTROL SYSTEM

BACKGROUND AND SUMMARY OF THE INVENTION

This invention relates in general to traction control systems in combination with vehicle dynamics control systems.

There are a multitude of methods and corresponding vehicle dynamics control systems and actuators for realizing traction control:
  (a) Combustion Engine (Otto, Diesel);
  (b) Electric Engines (axle-individual, wheel-individual);
  (c) All kind of Hybrid or Plugin Hybrid electric vehicles (PHEV, HEV) including serial hybrids, parallel hybrids and power-split hybrids A known traction control system in research is described for example in DE10 2015 222 059 A1. Another reference regarding the cascaded control structure is the application DE 10 2017 216 203.1.

Disadvantages of prior art:
  Significant nonlinearities of the vehicle dynamics and the oscillatory behavior of the drivetrain are not taken into account in the control design. This requires a multitude of applicative and additional functional actions. This results in a very high application effort.
  Poor control quality by means of tracking and disturbance attenuation behavior: The tracking task is to follow a ramp-shaped setpoint for the speed in the sense of tracking control which includes drag control (so called in German: "Schleppregelung", which refers to tracking ramp-like reference signals). The disturbance attenuation task is to reject disturbances, e.g. due to sudden changes of the road adhesion coefficient. These yield large dynamic and steady state drag/tracking error.
  A two degree of freedom approach for control design is used where the oscillatory behavior of the powertrain is neglected.
  The actuator dynamics of the combustion engine/electric engine is not considered during the design process.
  No complete proof of stability is available.
  Uncertain vehicle parameters that can only be estimated with great effort are used in the control laws (e.g. friction coefficient, tire parameters, vehicle mass).

This invention concerns a new cascaded controller structure for traction control. First drivetrain dynamics are examined in order to propose a suitable design model. The model parameters are then identified by a test procedure conducted on a passenger vehicle. Then a nonlinear controller design based on the derived model is introduced. Finally the proposed controller is applied to the test vehicle and experimental results are presented confirming the design method as well as the proposed procedure.

The classic structure of industrialized traction control systems consists of a dedicated driving dynamics control unit (DCU), which detects wheel slip and generates a limiting torque. This information is passed on to the engine control unit (ECU) where it is simply passed through to the engine. In the above mentioned references a new control structure was presented in which the detection of wheel slip to generate a set point (max. slip) is computed in the DCU and translated to a maximum wheel speed. This is communicated to the ECU where now the control algorithm is located. The controller translates the maximum wheel speed to a maximum engine speed via gear ratios and regulates the engine speed. This structural change enables faster and more precise controlling compared to the state of the art.

Since the control task has shifted from controlling the nonlinear slip to controlling the engine speed, new controllers have to be designed. For this task, first the plant dynamics have to be modeled and the parameters need to be identified. The exact generation of the slip set point is not of high interest for the inner control loop, as the inner control loop, implemented as a smart actuator, is supposed to be able to track various different reference trajectories.

The dynamics of the ICE will be modeled by a first order low-pass which roughly depicts the characteristics of a state of the art engine and approximates the behavior seen in measurements during phases of control. Second, the dynamics of the elastic power train are modelled by a two mass oscillator consisting of the engine shaft and the driven wheels connected by a gearbox, spring and damper. This is a new representation as a design model for traction control. Known publications only consider a rigid quarter-car model. Further, there is the nonlinear behavior of the tire force and tire slip.

In order to identify the engine and drivetrain dynamics, measurements of the vehicle response to steps in torque demand are conducted: The parametrization of the tire force model requires measurements on different road surfaces with various friction values, e.g. for dry asphalt, wet asphalt or snowy surface.

Since the system's behavior is dominated by the nonlinear tire force and slip characteristics, a nonlinear design approach is chosen. A controller law is formulated using the method of input-output linearization.

In this document, the following conventions are made: the terminology "wheel speed" includes for example the average speed of the wheels of the driven axle; the terminology "actual engine torque" includes for example also a measured, an estimated or a filtered engine torque. The term engine inertia refers to the inertia of the rotating parts of the powertrain connected to the engine. These are the complete powertrain except the half shaft and the wheels.

In case of a combustion engine the engine (rotational) speed represents the crankshaft (rotational) speed and the engine inertia includes the crankshaft inertia.

DETAILED DESCRIPTION OF THE DRAWINGS

Figure 1:
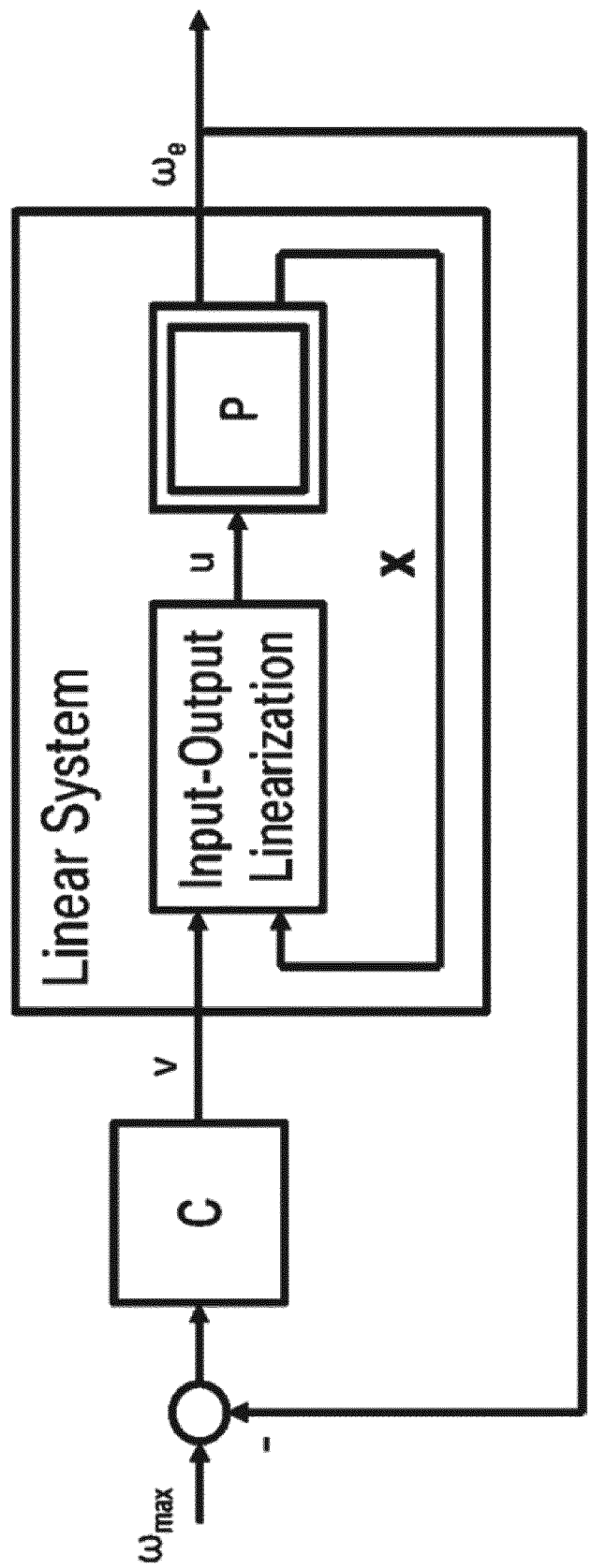
FIG. 1 shows a rough overview over the general control structure.

An important restriction on a controller being applied in an industrial environment is that the tire force cannot be an explicit part since the road conditions are not known a priori. This is achieved by using the rotational speeds of the engine and the accelerated axle, as well as their derivatives with respect to time. The ICE is modeled as a first order low pass. One then can use the wheel and engine speeds to estimate the torque variation in the flexible driveshaft. The general method of input-output linearization is depicted in FIG. 1.

The linearization results in a linear transmission behavior from the new control input "v" to the output, We. Using the state variables in the vector x and v, the control law generates the control input u. The new resulting system can now be controlled by a linear controller.

To verify the new approach the new controller structure is applied to the test vehicle. A critical test maneuver is chosen.

This is a step in the friction coefficient from high to low during high acceleration. Due to the high torque at friction change, the wheels begin to spin fast and the engine has to reduce the torque quickly. Also high torsional oscillations in the drivetrain are the outcome of this maneuver.

The result is that the controller is able to quickly track the set point and damp existing oscillations in the drivetrain. The invention proposes an overall method to model, identify and design a control law to regulate the maximum (in case of acceleration) and/or minimum (in case of deceleration) wheel speed as means of traction control. Regulating the maximum means that an upper bound (the maximum) for the wheel speed is computed. If the actual wheel speed exceeds this bound, the traction control system is activated and the maximum wheel speed is used as a reference value for tracking. Regulating the minimum means that a lower bound (the minimum) for wheel speed is computed. If the actual wheel speed falls below this bound, the traction control system is activated and the minimum wheel speed is used as a reference value for tracking. In addition also a specific setpoint of a wheel speed can be specified from a superior driving assistant, from a driving dynamics control system or from a component protection. The driving assistant and the driving dynamics control can be influenced by a driving mode.

The main actions to eliminate the disadvantages are:

Non-linear feedback of engine speed, wheel speed and estimated actual engine torque as well as numerical derivation of engine and wheel speeds.

Specification of a linear reference model for the input-output linearization in the sense that the closed-loop transfer behavior of the controlled system and nonlinear feedback corresponds to the transfer behavior of the reference model. A linear controller is used superimposed to compensate for remaining model errors and disturbance influences.

In order to achieve a quasi-stationary exact follow-up behavior to a ramp-shaped setpoint, a double integrating behavior in a closed control loop is used.

Figure 2:
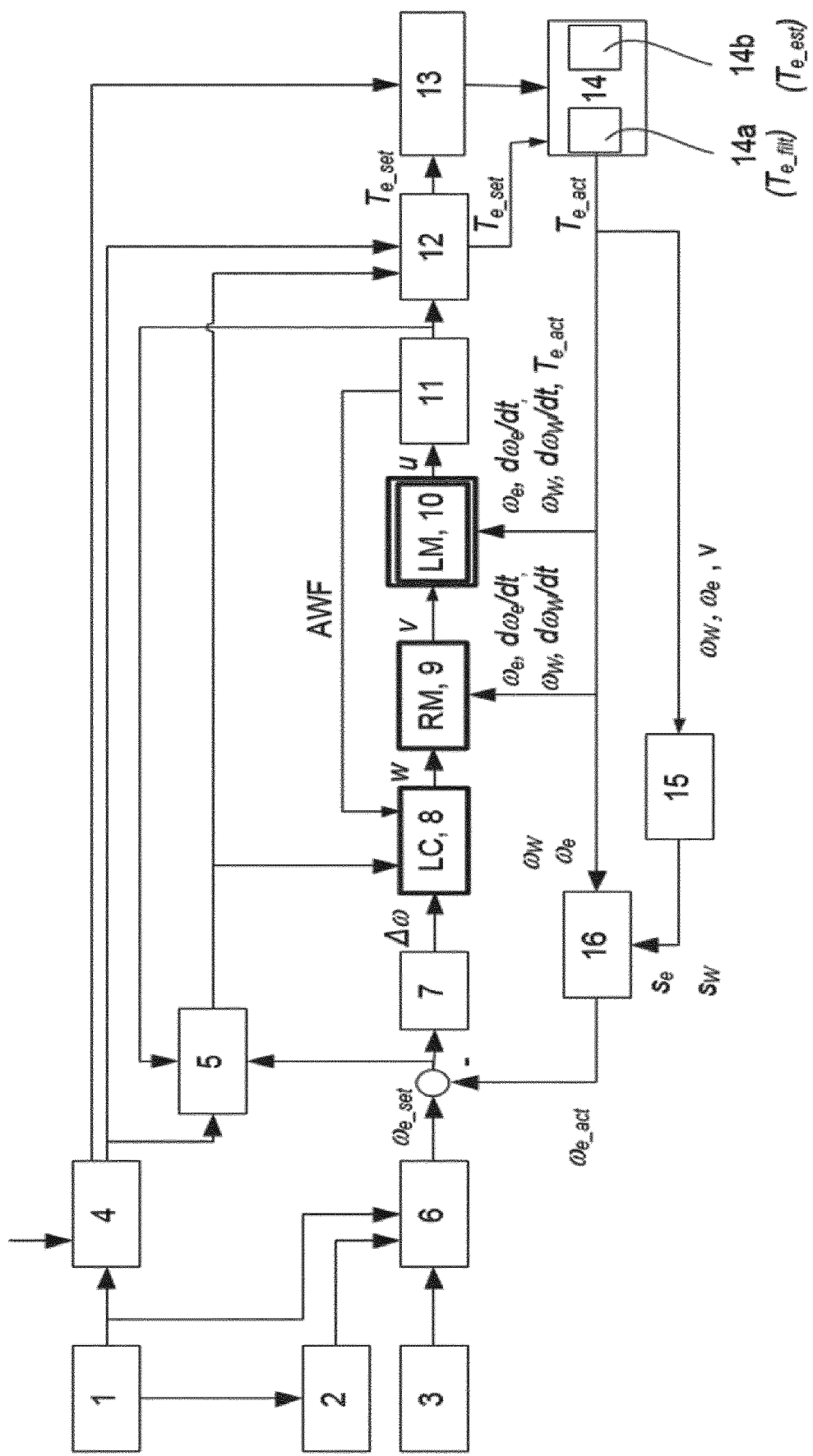
FIG. 2 shows an inventive application describing more details.

Other advantages of this invention will become apparent to those skilled in the art from the following detailed description of the preferred embodiment according to FIG. 2. FIG. 2 describes the inventive measures in more detail using a closed control loop.

The vehicle and powertrain dynamics can be described using a system of non-linear differential equations. The main difficulty for the development of an efficient control is the non-linearity of the tire-road contact, which is included in these differential equations. The non-linear behavior of the controlled system can be compensated and a desired dynamic can be imposed using the concept of input-output linearization according to Isidori. In practice, however, there are some challenges and difficulties to apply the concept:

1. no use of non-measurable and/or uncertain quantities (e.g. twisting angle, road adhesion coefficient, parameters describing the tyre force) in the control law
2. selection of a suitable desired reference dynamic that represents an idealized dynamical system suitable for traction control
3. selection of a suitable robust linear controller Item 1 is achieved by suitable, tunable filtering of the measured variables "engine speed" and "wheel speed" (corresponds to the average speed of the driven axle). In this way, those parts of the control law which contain uncertain parts (i.e. essentially those of the tyre-road contact) can be replaced by numerical approximations. In FIG. 1, "u" is the engine nominal torque, which is set by the controller and replaces the drivers desired torque in respective driving situations where slip control is needed. The quantity "u" is determined after executing the input-output linearization to $$u + x_1 + \tau_m\left[vJ_c i_G + \frac{2}{i_G}\left(k_c \dot{x}_2 + d_c\left(\frac{\dot{x}_3}{i_G} - \dot{x}_4\right)\right)\right]$$

The quantities in this equation are given as:

| Symbol | Type | Description | SI Unit |
| --- | --- | --- | --- |
| $x_1$ | Dynamic state | Actual engine torque | N m |
| $x_2$ | Dynamic state | Twisting angle of drive train | rad |
| $x_3$ | Dynamic state | Engine rotational speed | rad/s |
| $x_4$ | Dynamic state | Average rotational speed of the driven axis | rad/s |
| $\tau_m$ | Parameter | Time constant combustine engine a/o electric engine | s |
| $i_G$ | Parameter | Total GearRatio | — |
| $k_c$ | Parameter | Torsional stiffness of the half shaft | N m/rad |
| $d_c$ | Parameter | Torsional damping coefficient of the half shaft | N m s/rad |
| $J_c$ | Parameter | total substitute moment of inertia | Kg m^2 |

A point above a symbol describes the derivation according to time. In the equation above, the time derivatives $\dot{x}_2$, $\dot{x}_3$, $\dot{x}_4$ are included. While $\dot{x}_2$ can be determined via the equation $$\dot{x}_2 = \frac{x_3}{i_G} - x_4,$$

it is practically impossible to find a formula for $\dot{x}_3$ and $\dot{x}_4$, that meets all requirements, since the non-linear, uncertain tire forces and the twisting angle enter here. All these states/signales/variables are not measurable (without great effort) and therefore cannot be used for control.

However, if the derivatives are determined numerically using a suitable filter, the equations do not have to be used, but the measured quantities $x_3$, $x_4$ can be used. These are available in the vehicle by measurement and can therefore also be derived numerically. The remaining values in the above formula are parameters that can be determined very precisely from the system identification using standard procedures. Thus robustness of the control law is achieved.

Another challenge is the specification of a suitable reference behavior. In the equation above, this value is referred to as "v". This means: The theoretical, idealized engine rotational speed scaled with the ratio $i_G$ on wheel level, which would result under ideal, linear conditions (ideal here means: assuming slip is constant and thus force is constant, additionally considering a rigid drive train).

The specification of the reference model follows a relative approach: The desired model should behave like the vehicle under ideal, linear conditions with constant force. In "uncritical" driving situations, this results in dynamics that are very similar to the actual behavior, while in critical situations the resulting non-linearities are increasingly compensated. In FIG. 1, the reference behavior results from an IT1 element (integral element with first order lag). With the general form for the reference model (Laplace domain) $y(s)=b0/(a2\ s^2+a1\ s+a0)$, by selecting b0, a2, a1, a0 a variety of different reference models can be specified which describe the desired behavior for the input-output linearized system (nonlinear feedback law+nonlinear path). The preferred design for the reference model is an IT1 behavior (integrator with first-order delay element), $b0/(a2\ s^2+a1\ s)$.

The input in the reference model is designated "w" and describes the idealized torque associated with the idealized speed "v". This is set via a linear controller which determines the system deviation from the setpoint and actual variables. The task of the linear controller is to track a setpoint, compensate for external disturbances as well as the deviations of the reference model and the actual behavior. Another important point is the stationary compensation of the control error to zero, i.e. no asymptotic following/tracking error. In contrast to other approaches, the proposed measures simply achieve this by giving the linear controller an Integral component: During acceleration processes, mainly ramp-shaped specifications of the desired speed profile have to be tracked. In order to achieve this without asymptotic following/tracking error, a double integrator in the forward pass (open loop) is necessary for a linear system. Since the IT1 reference behavior already shows simple integrating behavior, an additional Integral component can be inserted in the linear controller to achieve stationary accurate subsequent behavior without asymptotic errors.

The most significant feedback variables for traction control are therefore:
- engine rotational speed
- Numerically determined derivation of engine speed
- Average speed of the driven axis
- Numerically determined derivative of the rotational speed of the driven axis
- Actual engine torque Allocation of tasks:
- Linear Controller: Tracking of a setpoint, attenuation/rejection of external disturbances as well as the deviations of the reference model and the actual behavior.
- Reference model: Specification of an ideal dynamic for the task of drag/tracking control (ideal linear system behavior)
- Input-output linearization: Realization of linear reference dynamics via compensation of non-linearities of the controlled system "v": Theoretical, idealized engine speed, scaled with the ratio $i_G$ at wheel level, which would result under ideal, linear conditions (ideal here: slip and thus constant force, rigid drive train).

"w": The torque belonging to the idealized speed "v" which is set by the linear controller.

"u": upper/lower limit for drive engine torque. Engine torque that compensates nonlinearities, inertia, damps the system, attenuates disturbances and tracks the desired rotational speed.

Advantages of the Invention

- Tracking behavior: Tracking error in trajectory tracking control is controlled dynamically and quasi-stationary with high precision
- Disturbance attenuation behavior: Disturbances (e.g. mu-jump, chessboard, friction value spots, wheel relief, . . . ) are rejected very quickly.
- Due to the good tracking and disturbance attenuation behavior the stability of the vehicle is increased.
- Traction is increased on all friction values and maneuvers (cornering traction, straight traction, starting traction, μ-split starting with/without gradient, μ-jump, starting).
- Robust good tracking and disturbance attenuation behavior against uncertain payload, different uncertain tyres used, road adhesion coefficient is achieved.
- Application effort is significantly reduced. For the nonlinear controller (input-output linearization), only the engine time constant, engine inertia, spring/damping coefficients of the drive train are required and can be easily identified in standard driving tests.
- Process can be used independently of the drive concept
  - Combustion engine (Otto, Diesel)
  - Electric engine
  - Hybrid concepts
  - Etc.
- Method can be used with different transmission concepts (manual switch, automatic transmission with torque converter transmission, double-clutch transmission)
- Speed limitation (e.g. for component protection) can be easily represented using this approach
- Method suitable for displaying a smart actuator concept for superimposed vehicle dynamics controllers, e.g. a rollover avoidance controller specifies slip/speed setpoint
- Method suitable for displaying a smart actuator concept for superimposed advanced driver assistance systems (parking systems highly/fully automated driving), e.g. an ADAS position and/or speed controller specifies slip/speed setpoint.
- In the starting range and during shifting operations (manual switch, automatic transmission with torque converter, double-clutch transmission) the wheel speeds are faded over.
- Adjustability via different setpoint levels (slip, speed and/or respective gradients) is easily possible (e.g. via appropriate display/operating concept).
- Simple conversion of slip to speed or speed to slip
- Combination with torque control via different concepts possible (lim/min/max or addition)
- Race-start function (optimum traction and/or with pre-definable speed/speed boost) easy to display (launch control, smokey burnout)
- Easily controllable drift can be achieved. During drift a certain speed setpoint profile can be specified The invention provides a system and method for speed/traction/slip control by influencing a driving engine (combustion engine (Otto, Diesel), electric engine, hybrid concepts, . . . ) torque of the vehicle. The method comprises the acts of:
- Setting a setpoint $\omega_{e\_set}$ for a speed/slip on a driven axle.
- Calculating an idealized nominal engine torque "w" from a linear control law (LC) 8 applied to the speed/slip error $\Delta\omega$.
- Calculating an idealized setpoint for the speed/slip "v" by applying a reference model 10 to the idealized nominal engine torque "w"
- Calculating a linearizing feedback with properties
  - Compensating the nonlinearities in the road surface contact
  - Compensating the inertia in the powertrain
  - Damping the powertrain
- Using for feedback
  - engine rotational speed We and/or wheel speed
  - Numerically determined derivation of engine speed $d\omega_e/dt$
  - Average speed of the driven axle $\omega_W$ Numerically determined derivative of the rotational speed of the driven axle dωw/dt Actual engine torque $T_{e\_act}$ applying the driving engine torque "u" to the engine to influence the traction and stability of the vehicle.

The approach also works alternatively if only "v" and $T_{e\_act}$ are used as input signals. In this case, the drive train is assumed to be rigid and powertrain vibrations and inertia effects are not compensated by the LM. The proposed method compensates for nonlinearities and, if the rotational velocities and accelerations are used for feedback, automatically damps powertrain oscillations and compensates powertrain inertia. Therefore, the proposed method also saves the time of tuning the damping mechanism and the inertia compensating mechanism.

The most important components of the invention are the linear control law module (LC) 8 for calculating an idealized nominal engine torque "w" applied to the speed and/or slip error Δω, the a reference module (RM) 9 for calculating an idealized speed and/or slip "v" by taking the idealized nominal engine torque "w", the engine rotational speed and acceleration $\omega_e$, $d\omega_e/dt$ as input signals and the Input-Output-Linearization Module (LM) 10 for calculating a setpoint "u" for an engine torque $T_{e\_set}$ using $\omega_e$, $d\omega_e/dt$, $\omega_W$, $d\omega_W/dt$ and $T_{e\_act}$, linearizing the nonlinear dynamics of the control system and therefore rejecting disturbances arising from vehicle- or wheel- or road- or powertrain-dynamics.

Input signals for the linearization module (LM) 10 in addition to the idealized speed and/or slip "v" are:
the engine rotational speed $\omega_e$
the numerically determined derivation of engine speed $d\omega_e/dt$
the average speed of the driven axle $\omega_W$
the numerically determined derivative of the rotational speed of the driven axle $d\omega_W/dt$ and
the determined actual engine torque $T_{e\_act}$.

Further expedient components of the control loop are the following:
a setpoint module 6 for setting a setpoint $\omega_{e\_set}$ for a rotational speed and/or slip on a driven axle,
a performance module 1, which influences the setpoint module 6 in dependence of the drivers demand or of the demand of an assist system,
a driving mode module 2, which also influences the setpoint module 6,
a component protection module 3, which also influences the setpoint module 6,
a known "HOG" controller 4 for controlling the performance demand signals to determine the actual engine torque $T_{e\_act}$,
a control activator module 5 to switch off and on the control loop dependent of defined limitation rules,
module 7 to calculate speed, if slip is measured,
a limit module 11, to limit the integration part of the controller over the anti-windup-feedback AWF,
a coordinator 12 to allow the controller to overrule the driver if necessary, for example to regulate the maximum (in case of acceleration) and/or minimum (in case of deceleration) wheel speed as means of traction control; in addition also a specific setpoint of a wheel speed can be specified,
a sensor signal processor 14 to watch the driving condition,
a slip determination module 15 for determining the wheel slip $s_W$ and/or the engine slip $s_e$,
a selector 16 to forward the actual speed-value $\omega_{e\_act}$.

In a preferred embodiment of the invention the actual engine torque $T_{e\_act}$ is determined
by using a weighting mechanism for an estimated engine torque $T_{e\_est}$ and the filtered value $T_{e\_filt}$ of the desired engine torque $T_{e\_set}$, whereby the filtered value represents the linearized behavior of the engine,
whereby the weighting mechanism determines how the estimated engine torque $T_{e\_est}$ and the filtered value $T_{e\_filt}$ of the desired engine torque $T_{e\_set}$ are combined, depending on the current state of the powertrain.

Therefore the electronic control unit includes a first determination module 14a to determine the estimated engine torque $T_{e\_est}$ and a second determination module 14b to determine the filtered value ($T_{e\_filt}$) of the desired engine torque ($T_{e\_set}$), whereby the weighting mechanism is designed to determine how the estimated engine torque ($T_{e\_est}$) and the filtered value ($T_{e\_filt}$) of the desired engine torque ($T_{e\_set}$) are combined.

Possible equation: $Te\_act=k*Te\_filt+(1-k)*Te\_est$ ($k=0 \ldots 1$)

For example in case of the following states of the powertrain the filtered value $T_{e\_filt}$ of the desired engine torque $T_{e\_set}$ is weighted stronger than the estimated engine torque $T_{e\_est}$:
reducing the engine torque during gear change or acceleration from stand still of the vehicle or
if other driving stability control functions overrule or influence the inventive system or method.

Figure 3:
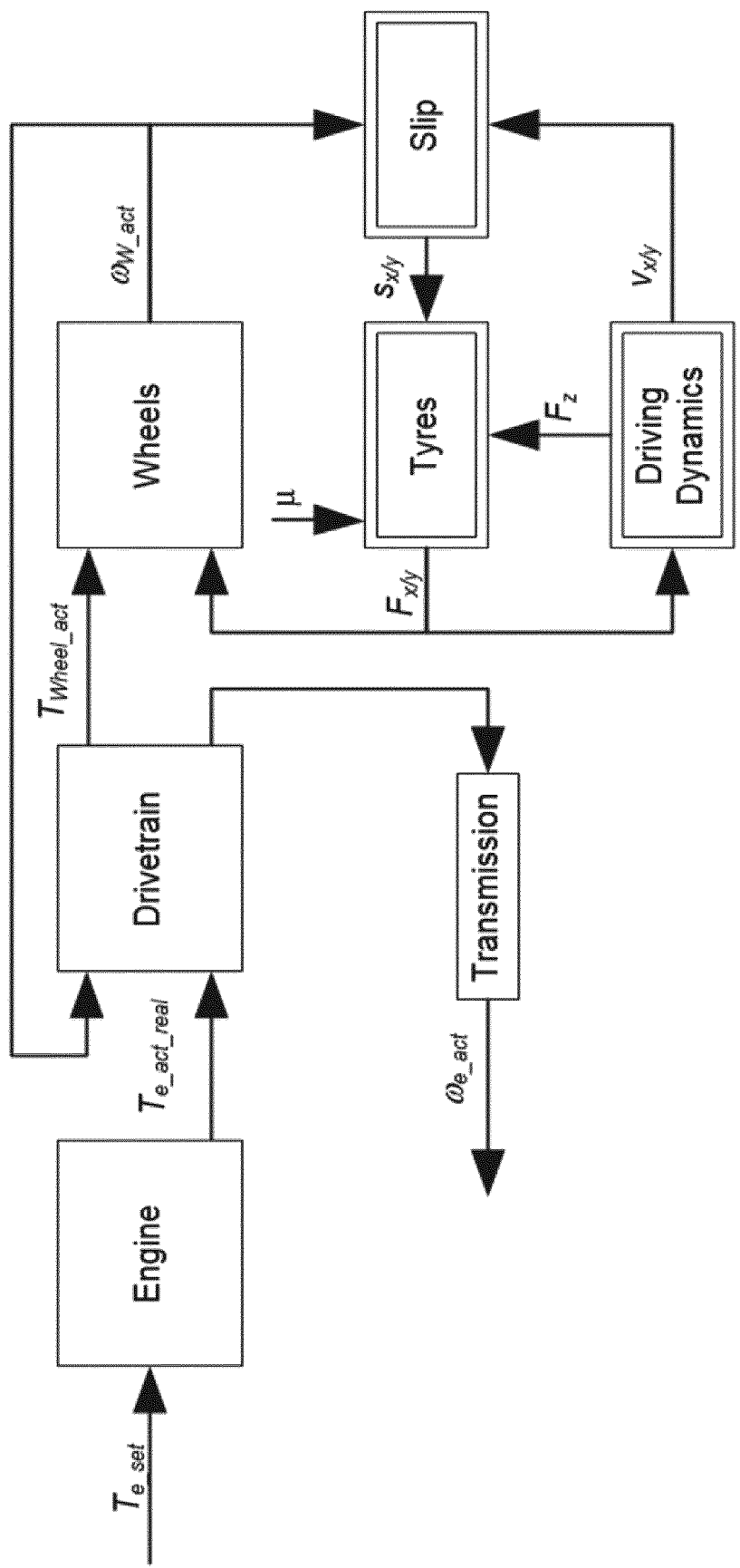
FIG. 3 shows an example of the controlled plant.

FIG. 3 shows an example of the controlled plant in particular with respect to a combustion engine. This control plant is an example for "module" 13 in FIG. 2. In particular the following parameters are considered:
$T_{e\_set}$=desired engine torque
$\omega_{e\_act}$=actual engine (for example crankshaft) speed
$\omega_{W\_act}$=actual wheel speed (for example the average speed of the wheels of the driven axle)
$T_{e\_act\_real}$=real actual engine torque
μ=friction coefficient
$F_{x/y}$=longitudinal/lateral wheel force
$s_{x/y}$=longitudinal/lateral slip
$v_{x/y}$=longitudinal/lateral vehicle speed
$T_{Wheel\_act}$=real actual wheel torque

The invention claimed is:

1. A traction control system for influencing a driving engine torque ($T_{e\_act\_real}$) of a vehicle including at least one electronic control unit, comprising:
a linear control law module (LC, 8) for calculating an idealized nominal engine torque (w) applied to speed and/or slip error (Δω);
a reference module (RM, 9) for calculating an idealized speed and/or slip (v) by taking the idealized nominal engine torque (w) and, in addition, at least engine rotational speed ($\omega_e$) and a numerically determined derivation of engine speed ($d\omega_e/dt$) as input signals;
a linearization module (LM, 10) for calculating a setpoint (u) for a desired engine torque ($T_{e\_set}$) by using at least engine speed ($\omega_e$), wheel speed ($\omega_W$) and a determined actual speed ($T_{e\_act}$) signals in such a way that behavior of the control system is linearized and that nonlinearities and dynamics arising from the vehicle, the wheels, the road or the powertrain that differ from reference dynamics implemented by the reference module (RM, 9) are compensated, and
a weighting mechanism and a first determination module (14a) to determine an estimated engine torque ($T_{e\_est}$) and a second determination module (14b) to determine a filtered value ($T_{e\_filt}$) of the desired engine torque ($T_{e\_set}$) that represents the linearized behavior of the engine, wherein the weighting mechanism is designed to determine how the estimated engine torque ($T_{e\_est}$) and the filtered value ($T_{e\_filt}$) of the desired engine torque ($T_{e\_set}$) are combined, depending on the current state of the powertrain.

2. The traction control system of claim 1 wherein input signals for the linearization module (LM, 10) in addition to the idealized speed and/or slip (v) are:

the engine rotational speed ($\omega_e$), and the numerically determined derivation of engine speed ($d\omega_e/dt$), and the average speed of the driven axle ($\omega_W$), and the numerically determined derivative of the rotational speed of the driven axle ($d\omega_W/dt$), and the actual engine torque ($T_{e\_act}$).

3. A method for traction control by influencing a driving engine torque ($T_{e\_act\_real}$) of the vehicle, the method comprising the acts of:

setting a setpoint ($\omega_{e\_set}$) for a speed and/or slip on a driven axle;

calculating an idealized nominal engine torque (w) from a linear control law (LC, 8) applied to speed and/or slip error ($\Delta\omega$);

calculating an idealized speed and/or slip (v) by applying a reference model (RM, 9) taking at least the idealized nominal engine torque (w), engine rotational speed ($\omega_e$) and a numerically determined derivation of engine speed ($d\omega_e/dt$) as input signals; and calculating a setpoint (u) for a desired engine torque ($T_{e\_set}$) by using a linearization module (LM, 10) and by taking at least engine speed ($\omega_e$), wheel speed ($\omega_W$) and a determined actual speed ($T_{e\_act}$) signals as input signals in such a way, that nonlinearities and dynamics arising from the vehicle or the wheels or the road or the powertrain that differ from reference dynamics implemented by the reference module (RM, 9) are compensated, wherein the actual engine torque ($T_{e\_act}$) is determined:

by using a weighting mechanism for an estimated engine torque ($T_{e\_est}$) and for the filtered value ($T_{e\_filt}$) of the desired engine torque ($T_{e\_set}$), wherein the filtered value ($T_{e\_filt}$) represents the linearized behavior of the engine, and the weighting mechanism determines how the estimated engine torque ($T_{e\_est}$) and the filtered value ($T_{e\_filt}$) of the desired engine torque ($T_{e\_set}$) are combined, depending on the current state of the powertrain.

4. The method of claim 3 wherein input signals for the linearization module (LM, 10) in addition to the idealized speed and/or slip (v) are:

the engine rotational speed ($\omega_e$), and the numerically determined derivation of engine speed ($d\omega_e/dt$), and the average speed of the driven axle ($\omega_W$), and the numerically determined derivative of the rotational speed of the driven axle ($d\omega_W/dt$), and the actual engine torque ($T_{e\_act}$).

* * * * *